(12) United States Patent
Kim

(10) Patent No.: US 10,884,111 B2
(45) Date of Patent: Jan. 5, 2021

(54) DISTANCE MEASURING APPARATUS

(71) Applicant: HITACHI-LG DATA STORAGE KOREA, INC., Seoul (KR)

(72) Inventor: Taesung Kim, Seoul (KR)

(73) Assignee: HITACHI-LG DATA STORAGE KOREA, INC., Seoul (KR)

( * ) Notice: Subject to any disclaimer, the term of this patent is extended or adjusted under 35 U.S.C. 154(b) by 370 days.

(21) Appl. No.: 15/934,504

(22) Filed: Mar. 23, 2018

(65) Prior Publication Data

US 2018/0275257 A1 Sep. 27, 2018

(30) Foreign Application Priority Data

Mar. 24, 2017 (KR) ........................ 10-2017-0037464

(51) Int. Cl.
| | |
|---|---|
| *G01S 7/00* | (2006.01) |
| *G01S 7/497* | (2006.01) |
| *G01S 17/08* | (2006.01) |
| *G01S 7/481* | (2006.01) |
| *G01S 17/48* | (2006.01) |
| *G01S 17/42* | (2006.01) |

(52) U.S. Cl.
CPC .......... *G01S 7/4972* (2013.01); *G01S 7/4813* (2013.01); *G01S 7/4817* (2013.01); *G01S 17/08* (2013.01); *G01S 17/42* (2013.01); *G01S 17/48* (2013.01)

(58) Field of Classification Search
USPC ....................................................... 356/3.05
See application file for complete search history.

(56) References Cited

U.S. PATENT DOCUMENTS

| | | | | | |
|---|---|---|---|---|---|
| 5,109,459 | A | * | 4/1992 | Eibert .................. | G02B 26/103 250/227.26 |
| 5,225,876 | A | * | 7/1993 | Lux ........................ | G01S 7/4817 356/2 |
| 7,349,074 | B2 | * | 3/2008 | Zambon .................. | E05F 15/74 356/5.01 |
| 7,446,862 | B2 | * | 11/2008 | Zambon .................. | G01S 17/42 356/5.01 |
| 8,773,646 | B2 | * | 7/2014 | Schwanke ............. | G01S 7/4818 356/4.1 |
| 9,316,724 | B2 | * | 4/2016 | Gehring ................. | G01S 17/42 |
| 9,784,838 | B1 | * | 10/2017 | Shpunt .................. | G01S 7/4817 |
| 9,835,853 | B1 | * | 12/2017 | Shpunt ................... | G01S 17/42 |
| 10,247,812 | B2 | * | 4/2019 | Shpunt ................. | G02B 26/101 |
| 2006/0169876 | A1 | * | 8/2006 | Zambon .................. | G01S 17/04 250/221 |

(Continued)

*Primary Examiner* — James R Hulka
(74) *Attorney, Agent, or Firm* — Birch, Stewart, Kolasch & Birch, LLP

(57) ABSTRACT

The distance measuring apparatus according to the present invention may comprise: a light emitting unit for emitting light; a light receiving unit comprising one or more cells configured to receive incoming light and output a signal corresponding to an amount of the received light; a motor; a first rotary unit for changing a path of outgoing light which is emitted from the light emitting unit while being rotated by the motor; and a second rotary unit for changing a path of the incoming light so that the incoming light enters the light receiving unit while being rotated by the motor synchronously with the first rotary unit. Therefore, it is possible to simplify the structure of the apparatus which measures distances in a wide angular range.

9 Claims, 12 Drawing Sheets

(56) References Cited

U.S. PATENT DOCUMENTS

| | | | |
|---|---|---|---|
| 2008/0007710 A1* | 1/2008 | Zambon | G01S 7/481 |
| | | | 356/5.01 |
| 2011/0085154 A1* | 4/2011 | Schwanke | G01S 7/4818 |
| | | | 356/4.01 |
| 2014/0166866 A1* | 6/2014 | Gehring | G01S 17/42 |
| | | | 250/234 |
| 2016/0146939 A1* | 5/2016 | Shpunt | G01S 7/4817 |
| | | | 356/5.01 |
| 2017/0097407 A1* | 4/2017 | Shpunt | G02B 26/101 |
| 2018/0267168 A1* | 9/2018 | Kim | H02K 11/22 |
| 2020/0150209 A1* | 5/2020 | Kirillov | G01S 17/10 |

* cited by examiner

DISTANCE MEASURING APPARATUS

This application claims the benefit of priority under 35 U.S.C. § 119(a) to Korean Patent Application No. 10-2017-0037464 filed on Mar. 24, 2017, which is incorporated by reference herein in its entirety.

BACKGROUND

Field

The present invention relates to a rotary distance measuring apparatus, and more particularly, to a structure of a distance measuring device for measuring a distance in a wide angle range.

Related Art

Due to an increase in the elderly population, a well-being fad, and hard work avoidance, the demand for housework assistant robots such as robot cleaners has increased and the service robot market has been growing. A service robot based on autonomous driving recognizes an indoor configuration environment, creates an indoor terrain map, detects obstacles, and moves according to autonomous determination. Therefore, various sensors including a distance measuring sensor for distance measurement are employed in the service robot.

Examples of the sensor for measuring a distance include an infrared sensor using infrared rays, an ultrasonic sensor using ultrasonic waves, and a TOF sensor. The infrared sensor can measure a distance to a target object by using a PSD (Position Sensitive Detector) that emits infrared light via a light source, receives the incoming light reflected from the surface of the target object and calculates a light receiving point by an output current according to a triangulation principle. The TOF sensor comprises a light source such as an LED emitting a very short infrared pulse and a light receiving sensor for detecting reflected light reflected from an object and calculates the distance to the object by measuring the interval from the time when light is emitted from the light source to the time when the light reflected from the object is returned to the light receiving sensor.

FIG. 1 is a top view of a distance measuring apparatus for measuring distances, and is directed to the infrared sensor using triangulation principle or the TOF sensor using triangulation.

The distance measuring apparatus may include a light emitting unit for emitting an infrared ray or an infrared pulse, and a light receiving unit for detecting the light which is emitted by the light emitting unit and then reflected by a target object.

The light emitting unit may include a light source such as a laser diode for generating an infrared ray outside the visible light beam and a collimator lens for outputting the ray as parallel light. The light receiving unit may include a light receiving lens for outputting an incident light in a predetermined size and shape, a band pass filter for receiving the wavelength band of the laser beam emitted from the light emitting source, and a detector for detecting the incident light and outputting it as an electric signal. In the triangulation method the position at which the reflected and incident light is formed varies depending on the distance, so the detector of the distance measuring apparatus using the triangulation method can measure the distance to an object by using the position of the incident light.

Meanwhile, since the service robot assumes movement, if the mounted distance measuring device measures the distance only in a fixed direction, a large number of distance measuring devices are required to measure the distances in various directions. Taking this into consideration, a distance measuring device for measuring a distance in 360 degrees or a predetermined angle range while rotating is being developed.

FIG. 2 shows a structure of a conventional rotary distance measuring apparatus for measuring a distance while a mirror rotates.

In the distance measuring apparatus of FIG. 2, a light emitting unit and a light receiving unit are arranged to face each other on a rotation axis. Each of two mirrors has a reflecting surface at an angle of 45 degrees with the rotation axis. While the two mirrors rotates about the rotation axis, one of two mirrors reflects the light radiated in a direction in which the rotation axis extends by a laser diode included in the light emitting unit such that the reflected light is output in all directions 360 degrees and the other of two mirrors, and the other of the two mirrors reflects the light, reflected on an object and returned, in the direction in which the rotation axis extends such the reflected light is converged on a detector included in the light receiving unit. The distance measuring apparatus obtains a signal by the incident light converged on the detector, and calculates a distance based on the signal.

The two mirrors rotate by a motor and other components are fixed. Both of the two mirrors must be arranged on the rotation axis and the light emitting unit and the light receiving unit which do not rotate must also be accurately positioned on the rotation axis. Since the light receiving unit are embedded in a PCB (Printed Circuit Board), there is little problem to accurately arrange the light receiving unit on the rotation axis. But, it is not easy to align the light emitting unit with the rotation axis at a distance from the PCB.

Furthermore, the two mirrors must rotate exactly at the center of the rotation axis in an empty space between the light emitting unit and the light receiving unit in a state that the two mirrors are connected to a body which is rotated by the motor. But, it is difficult to get high precision.

FIG. 3 shows a structure of a conventional rotary distance measuring apparatus for measuring a distance while a distance measuring body rotates.

In the rotary distance measuring apparatus shown in FIG. 2, the distance measuring body including the light emitting unit and the light receiving unit of FIG. 1 emits a laser beam and obtains a signal by the incident light reflected on an object and formed on the detector while rotating by a motor. And the distance measuring body transmits the signal to a main PCB, which is fixed without rotation, to calculate a distance based on the signal.

The distance measuring body receives the rotary force of the motor mounted on the outside through a belt. A bearing is provided between a rotary body and a motor plate to reduce rolling friction and supports the rotary body on the fixed motor plate so that the rotary body stably rotates in a constant orbit.

A pair of inductor coils (rotary inductor coil and fixed inductor coil) wound in a cylindrical shape are arranged at the center of the apparatus so that power can be applied to the rotary body from a main PCB wirelessly. The rotary PCB constructed on the rotary body converts the signal related to the distance obtained by the distance detecting body into light through the LED and transmits it to the main PCB through the passage provided at the center of the apparatus. The main PCB may detect the light via a detector and obtain distance information.

However, since a signal is transmitted from the rotary body to the fixed PCB through the LED and the detector, the structure of the apparatus is complicated and there is a structural restriction to provide the passage at the center of the apparatus. That is, according to this restriction, the motor cannot directly drive the rotary body, but must drive the rotary body indirectly through the belt, and the rotary body must be supported on the fixed plate through the bearing.

Further, since the belt connected to the motor drives the body to rotate, noise is generated due to the rotation of the belt, and the life of the product is limited due to the durability of the belt or bearing.

SUMMARY

Accordingly, the present invention has been made in view of such circumstances, and it is an object of the present invention to simply construct a distance measuring apparatus for measuring a wide angle range.

A rotary distance measuring apparatus according to an embodiment of the present invention may comprise: a light emitting unit for emitting light; a light receiving unit comprising one or more cells configured to receive incoming light and output a signal corresponding to an amount of the received light; a motor; a first rotary unit for changing a path of outgoing light which is emitted from the light emitting unit while being rotated by the motor; and a second rotary unit for changing a path of the incoming light so that the incoming light enters the light receiving unit while being rotated by the motor synchronously with the first rotary unit.

In an embodiment, the first rotary unit may comprise a first mirror for changing the path of the outgoing light by 90 degrees and a first barrel one end of which is open toward the light emitting unit and the other end of which is equipped with the first mirror, and the second rotary unit may comprise a second mirror for changing the path of the incoming light by 90 degrees and a second barrel one end of which is open toward the light receiving unit and the other end of which is equipped with the second mirror.

In an embodiment, the first and second mirrors may be oriented toward a same direction while the first and second rotary units synchronously rotate.

In an embodiment, gears which are respectively formed on outer circumferences of the first and second barrels may be respectively engaged with a gear formed on a rotation shaft of the motor.

In an embodiment, a cam path may be formed on an outer circumference of at least one of the first and second barrels such that the at least one moves up and down while the first and second rotary units rotate.

In an embodiment, while the first and second rotary units synchronously rotate, the first mirror may be placed at a highest position when the outgoing light reflected at the first mirror advances toward the second rotary unit and the first mirror may be placed at a lowest position when the outgoing light reflected at the first mirror advances toward a direction opposite to the second rotary unit.

In an embodiment, the first mirror may be disposed higher than the second mirror.

In an embodiment, the first mirror may be narrower than the second mirror in their widths, the width of the first mirror indicating a distance along a direction perpendicular to both a first direction in which the outgoing light radiated from the light emitting unit advances toward the first mirror and a second direction in which the outgoing light which is reflected by the first mirror advances.

In an embodiment, the first and second rotary units may be arranged in a symmetrical manner about a rotation axis of the motor.

In an embodiment, the first rotary unit, a rotation axis of the motor, and the second rotary unit may be arranged at an cute angle.

In an embodiment, the apparatus may further comprise a cap for covering the light emitting unit, the light receiving unit, the motor, the first rotary unit and the second rotary unit.

A rotary distance measuring apparatus according to another embodiment of the present invention may comprise: a light emitting unit for emitting light; a light receiving unit comprising one or more cells configured to receive incoming light and output a signal corresponding to an amount of the received light; a motor; a rotary unit comprising a mirror for changing a path of the outgoing light by 90 degrees and changing a path of the incoming light by 90 degrees so that the incoming light enters the light receiving unit and a barrel one end of which is open toward the light emitting unit and the light receiving unit and the other end of which is equipped with the mirror.

In an embodiment, an interval between the light emitting unit and the light receiving unit may be less than a diameter of the barrel.

Accordingly, it is possible to overcome the structural limitations of the conventional rotating distance measuring apparatus in which a light emitting unit, a light receiving unit, and two mirrors must be aligned on a rotation axis. And, a distance can be measured in a wide angle range by using a simple structure while not using the structure in which power and signals are wirelessly transmitted and received between a rotating body and a fixed body.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Hereinafter, embodiments of a distance measuring apparatus according to the present invention will be described in detail with reference to the accompanying drawings.

Figure 4:
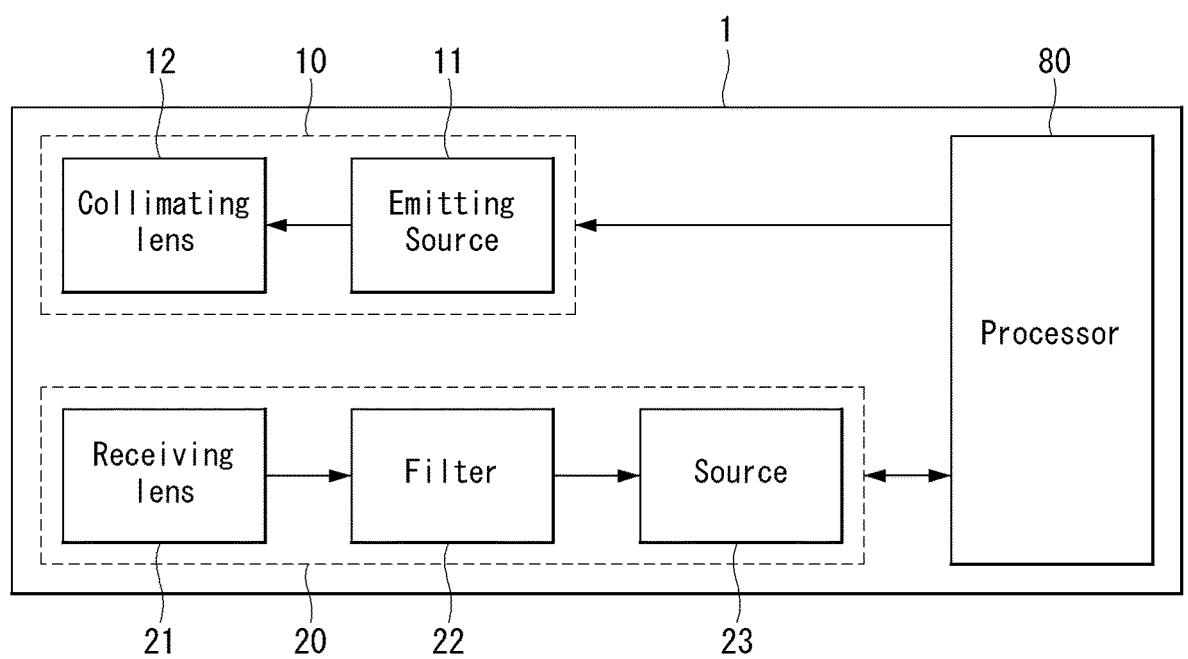
FIG. 4 shows a configuration of a distance measuring unit in units of functional blocks, FIG. 5 schematically shows a structure of a distance measuring apparatus according to a first embodiment of the present invention.

First, FIG. 4 shows a configuration of a distance measuring unit in units of functional blocks The distance measuring unit of FIG. 4 may be applied to a distance measuring apparatus according to the present invention for measuring a wide angular range. The distance measuring unit 1 may comprise a light emitting unit 10 for emitting an infrared pulse with a specific width, a light receiving unit 20 for detecting the reflected light of the infrared light that is radiated by the light emitting unit 10 and then reflected by an object, and a processor 80 for calculating the distance to the object based on the output signal of the light receiving unit 234 using the triangulation method and/or the TOF method.

The light-emitting unit 10 may comprise a light-emitting source 11 comprising a light-emitting module, such as an LED for radiating infrared light and a driving unit for driving the light-emitting module so that it emits light in a pulse shape with a predetermined width, and an optical system for controlling an angle and/or an intensity of light to be radiated in the front surface of the light-emitting source 11, for example, a collimator lens 12.

The light receiving unit 20 may comprise a light receiving lens 21 for converting incident light in a specific size and shape, such as a telecentric lens, a filter 22 for selectively transmitting only a wavelength band of the light emitted by the light emitting source 11, and a light receiving sensor 23 comprising a plurality of cells aligned in one direction in order to detect the reflected light.

In order to measure a distance using the TOF method, each of the cells of the light receiving sensor 23 may receive reflected light in synchronization with an infrared pulse emitted by the light emitting source 11 (phase 1), receive reflected light with a phase difference of 180 degrees from the infrared pulse emitted by the light-emitting source 11 (phase 2), and output an electrical signal V1 for the phase 1 and an electrical signal V2 for the phase 2.

The processor 80 may calculate a distance to an object from which the emitted light is reflected by using the electrical signals output from the cells of the light-receiving sensor 23. The processor 80 may identify a cell at which a center point of the converged light is placed using a distribution of the cells (i.e., the intensities of the electrical signals and the section of the cells generating the electrical signals) or a cell at which a maximum value of the electrical signals is placed, and calculate a distance using the electrical signals output from the identified cell or the electrical signals output from the surrounding cells including the identified cell using in the TOF method.

That is, the processor 80 may calculate a distance to an object by calculating the time that is taken for the emitted light to be converged on the light receiving sensor 237 as the reflected light, based on the electrical signal V1 of the phase 1 and the electrical signal V2 of the phase 2 generated by the cells of the light receiving sensor 237, in accordance with the TOF method. Or, the processor 80 may calculate a distance to an object based on the positions of cells at which the incident light converges in accordance with the triangulation method. Or the processor 80 may calculate the distance using the triangulation method and the TOF method in an associated manner.

Figure 1:
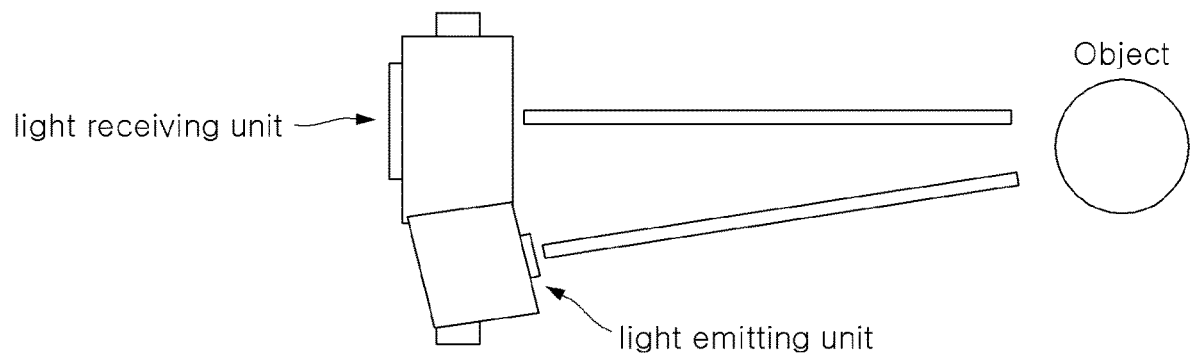
FIG. 1 is a top view of a distance measuring apparatus for measuring distances.
Figure 2:
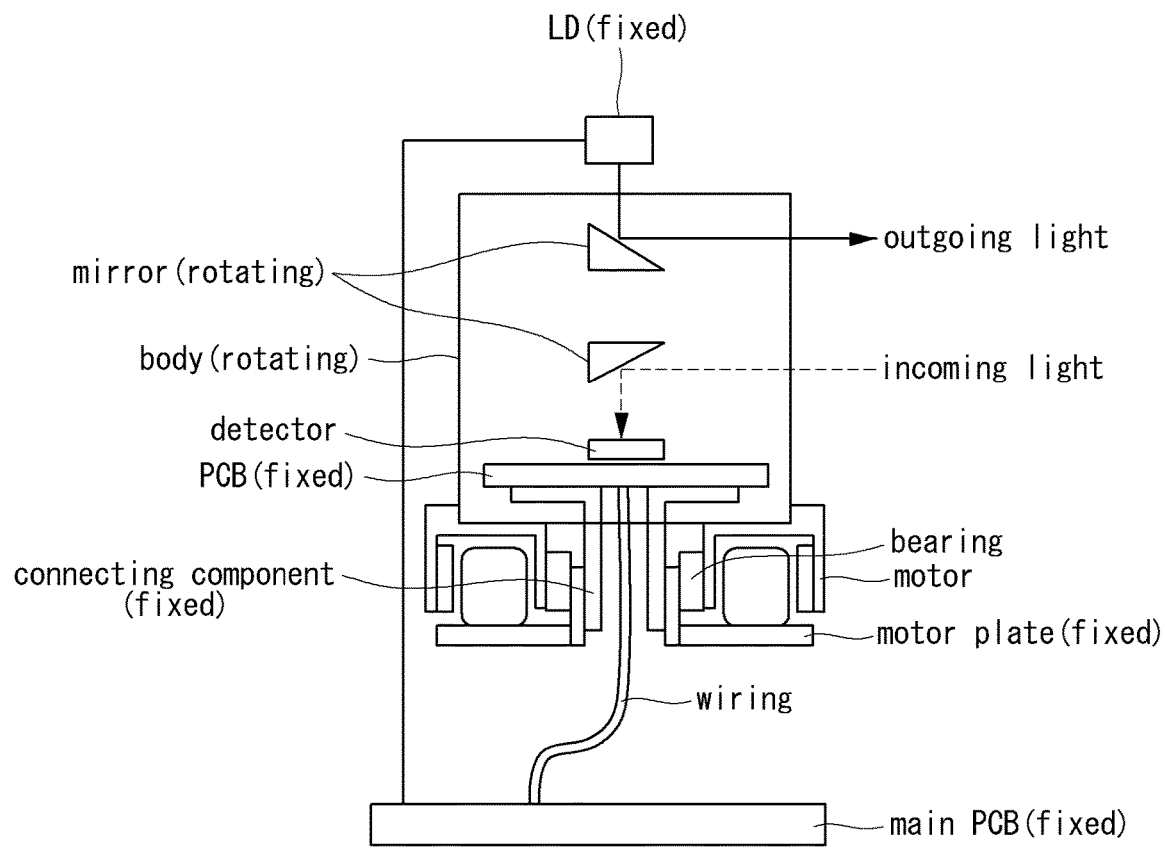
FIG. 2 shows a structure of a conventional rotary distance measuring apparatus for measuring a distance while a mirror rotates.
Figure 3:
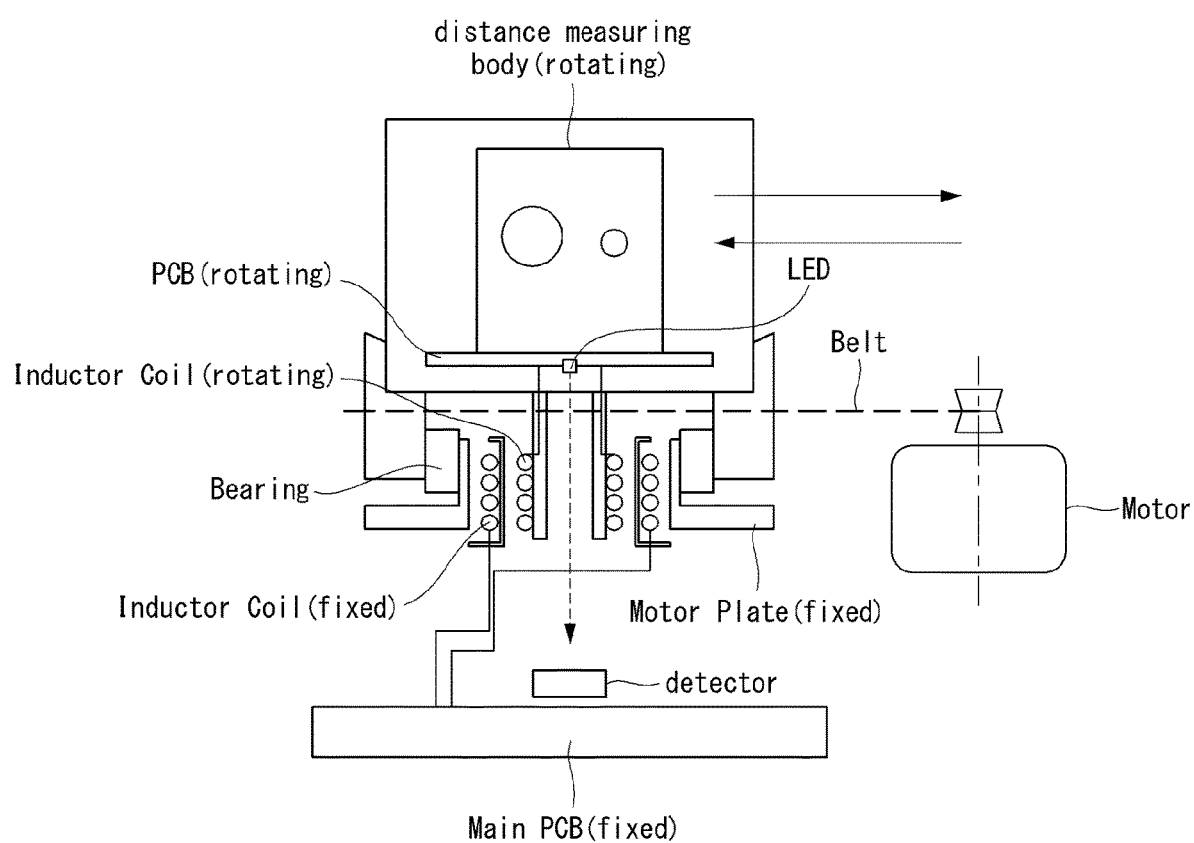
FIG. 3 shows a structure of a conventional rotary distance measuring apparatus for measuring a distance while a distance measuring body rotates.

In order to measure a distance in a wide angle range or 360 degree angle range, a distance measuring apparatus must rotate mirrors about a rotation axis virtually connecting a light emitting unit and a light receiving unit as shown in FIG. 2, or must wirelessly transmit and receive power and signals to and from a distance measuring unit while rotating the distance measuring unit as shown in FIG. 3. However, as mentioned above, there are problems in that it is not easy to align a plurality of components with high accuracy on a rotation axis and the structure for wirelessly drawing power and signals to the rotating body is complicated.

In order to simplify the structure of the distance measuring apparatus for measuring a distance in a wide angle range, the present invention does not rotate but fix a light emitting unit and a light receiving unit, and rotates two mirrors for changing the paths of emitted light and incident light in a synchronized manner by connecting the two mirrors to one motor such that the outgoing direction of the emitted light from an outgoing mirror and the incoming direction of reflected light to an incoming mirror become same (exactly the outgoing direction and the incoming direction become 180 degrees from each other).

In order to solve the problem that a light outputting path and a light incident (or incoming) path overlap with each other while mirrors rotates, when rotating a component for outgoing light and/or a component for incoming light, the present invention causes one of them to move up and down or in a vertical direction. That is, when the light outgoing path and the light incoming path are overlap with each other, the present invention may make the mirror for outgoing light higher or lower than the mirror for incident or incoming light.

Or, while not causing the component for outgoing light and the component for incoming light to move up and down, the distance measuring apparatus may measure distances only in some angular ranges, not in full 360 degree angles. In this case, in order to widen a angular range in which distances can be measured, a mirror for outgoing light may be disposed higher than a mirror for incoming light, and the width of the mirror for outgoing light may be narrower than the width of the mirror for incoming light.

Figure 5:
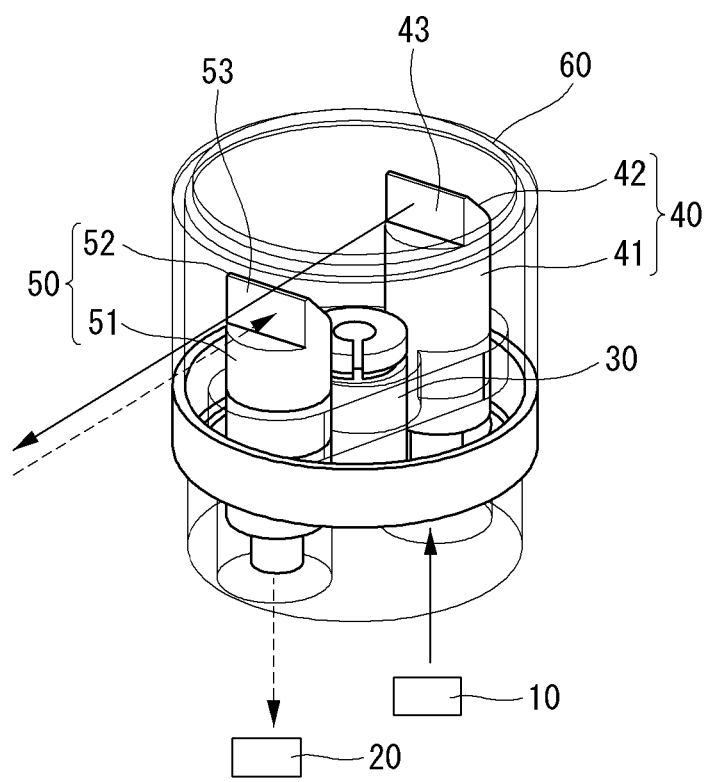

FIG. 5 schematically shows a structure of a distance measuring apparatus according to a first embodiment of the present invention.

The distance measuring apparatus 1 of FIG. 5 may comprise a distance measuring unit comprising a light emitting unit 10 and light receiving unit which are mounted on the bottom surface of the apparatus to face upward, a motor 30, a first rotary unit 40 comprising a first barrel 41, one end (the end facing the bottom surface of the apparatus) of which is opened toward the light emitting unit 10 and the other end of which is equipped with a first mirror 42 for changing the path of the emitted light emitted from the light emitting unit 10, a second rotary unit 50 comprising a second barrel 51, one end of which is opened toward the light receiving unit 20 and the other end of which is equipped with a second mirror 52 for changing the path of the reflected light reflected from an object so that the reflected light is to be directed back to a light receiving sensor of the light receiving unit 20.

The distance measuring apparatus 1 of FIG. 5 may further comprise a cap (or a cover) 60 for covering and protect the distance measuring unit, the motor 30, the first rotary unit 40 and the second rotary unit 50 from external impact or dust. In the cap 60, a well-penetrating window may be formed only in a predetermined region (a 360-degree strip region of a predetermined height or width) through which the emitted light from the light emitting unit 10 passes and the reflected light reflected from an object is incident, and a remaining region may be formed to be opaque so as not to introduce unnecessary light.

Gears are respectively formed in a rotation axis of the motor 30, an outer circumference of the first barrel 41 and an outer circumference of the second barrel 51. The gear of the rotation axis of the motor 30 and the gear of the outer circumference of the first barrel 41 are engaged with each other, and the gear of the rotation axis of the motor 30 and the gear of the outer circumference of the second barrel 51 are engaged with each other, so the first and second rotary units 40 and 50 may rotate in a synchronized manner.

A first mirror 42 is mounted on the upper part of the first barrel 41 at an angle of 45 degrees with respect to a horizontal (or vertical) direction, so causes the emitted light, which is radiated from the light emitting unit 10 mounted on the bottom surface of the apparatus and pass through the inside of the first barrel 41 to advance vertically upward, to be deflected by 90 degrees to advance in a horizontal direction.

A second mirror 52 is mounted on the upper part of the second barrel 51 at an angle of 45 degrees with respect to the horizontal (or vertical) direction, so causes the reflected light, which is reflected on an object and incident in the horizontal direction, to be deflected to advance vertically downward, such that the reflected light passes through the inside of the second barrel 51 and enters a light receiving sensor 23 of the light receiving unit 20 mounted on the bottom surface of the apparatus.

Additional mirrors may be respectively mounted on the lower portions of the first and second barrels 41 and 51 to additionally change the paths of light, so the light emitting unit 10 and the light receiving unit 20 may be mounted on the bottom surface of the apparatus in the horizontal direction not in the vertical direction.

In order for the motor 30 to synchronously rotate the first and second rotary units 40 and 50, the outer diameters of the portions, at which the gears to be engaged with the gear of the motor 30 are formed, are same as each other in the first and second barrels 41 and 51.

The synchronous rotation of the first and second rotary unit 40 and 50 means that a light outgoing surface 43 of the first mirror 42 and a light incoming surface 53 of the second mirror 52 are always oriented in a same direction or parallel to each other. Here, the light outgoing surface 43 indicates a surface which reflects light in the first mirror 42 and the light incoming surface 53 indicates a surface with reflects light in the second mirror 52.

In FIG. 5, the first and second rotary units 40 and 50 are disposed in a symmetrical manner about a rotation axis of the motor 30.

Figure 6:
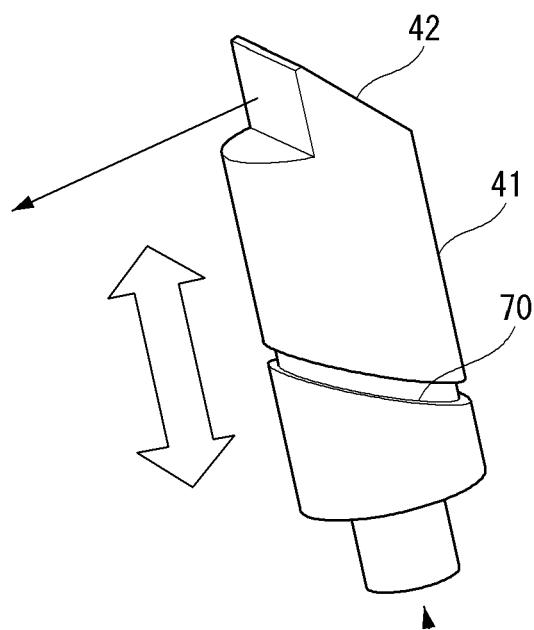
FIG. 6 shows the rotary unit moving up and down.

FIG. 6 shows the rotary unit moving up and down.

There are angles at which a light outgoing path and a light incoming path overlap each other when a mirror for the outgoing light and a mirror for the incoming light synchronously rotate. That is, there are one case in which the outgoing light reflected by the first mirror 42 to advance in a horizontal direction is directed to the second mirror 52, and another case in which the outgoing light reflected by the first mirror 42 to advance in the horizontal direction is directed in an opposite direction to the second mirror 52 and then an incoming light advancing to the second mirror 52 is directed to the first mirror 42.

If the first and second mirrors 42 and 52 are at a same height in these cases, the outgoing light is blocked by the second mirror 52 and is not radiated to outside of the apparatus, or the incoming light is blocked by the first mirror 42 and is not incident on the second mirror 52.

To solve the problem, by causing at least one of the first and second rotary unit 40 and 50 to move up and down when rotating, the present invention may make the height of the first mirror 42 become different from the height of the second mirror 52 when the light outgoing path and the light incoming path overlap each other, so that the paths of the outgoing light and the incoming light are not blocked.

In FIG. 6, a cam path 70 is formed on the outer circumference of the first barrel 41 for the outgoing light and engaged with a fixed projection or a boss (not shown), so the first barrel 41 can move up and down while rotating. In other words, the first mirror 42 can be positioned higher than the second mirror 52 when the outgoing light the path of which is changed by the first mirror 42 advances toward the second mirror 52, and the first mirror 42 can be positioned lower than the second mirror 52 when the outgoing light the path of which is changed by the first mirror 42 is directed in an opposite direction to the second mirror 52. The cam path may be formed on the outer circumference of the first barrel 41 and/or the outer circumference of the second barrel 51.

Figure 7A:
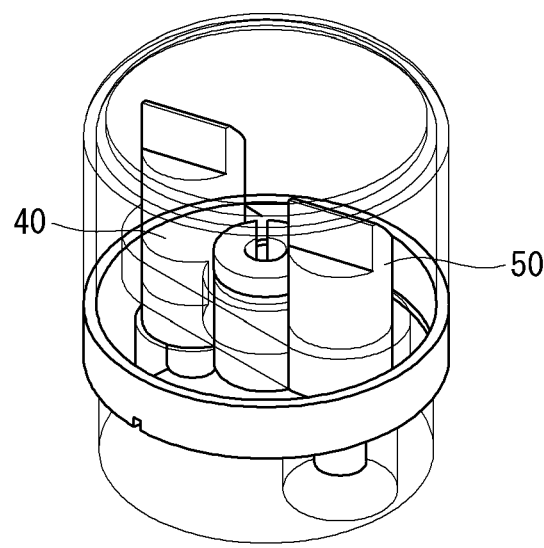
FIGS. 7a to 7c show that a light outgoing surface and a light incoming surface have a same direction when the first and second rotary units are arranged symmetrically about a motor rotate.
Figure 7B:
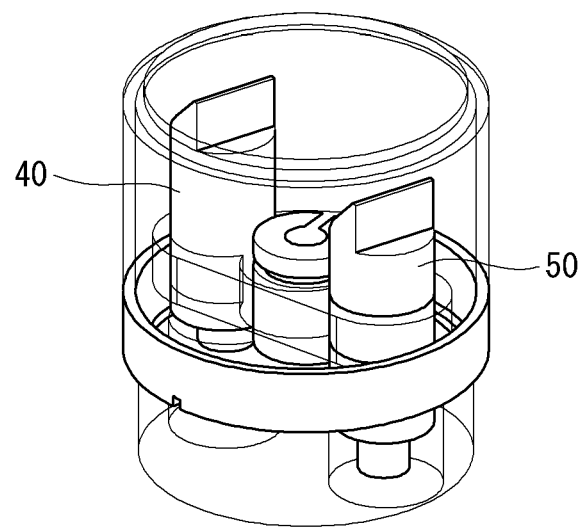
Figure 7C:
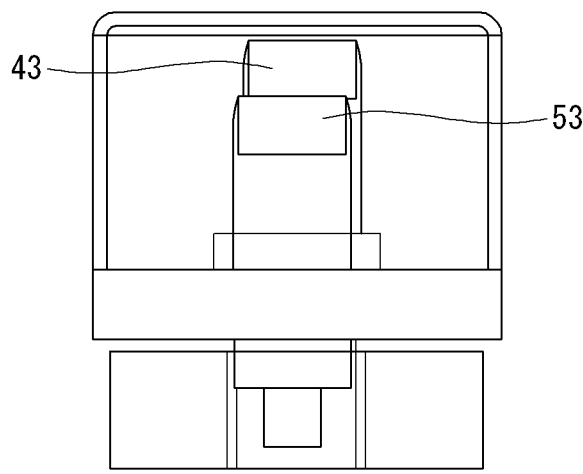

FIGS. 7a to 7c show that a light outgoing surface and a light incoming surface have a same direction when the first and second rotary units are arranged symmetrically about a motor rotate.

FIG. 7a shows the moment at which the light outgoing surface 43 of the first mirror 42 and the light incoming surface 53 of the second mirror 52 are directed in a different direction in which the first rotary unit 40, the motor 30 and the second rotary unit 50 are aligned in a line, while the first and second rotary units 40 and 50 synchronously rotate. At the moment, since the outgoing light and the incoming light are not blocked by the second mirror 52 and the first mirror 42, there is no problem even though the heights of the first mirror 42 and the second mirror 52 become same.

However, FIGS. 7b and 7c show the moment at which the light outgoing surface 43 of the first mirror 42 and the light incoming surface 53 of the second mirror 52 (or the horizontally advancing directions of the outgoing light and the incoming light) are directed in a same direction in which the first rotary unit 40, the motor 30 and the second rotary unit 50 are aligned in a line, while the first and second rotary units 40 and 50 synchronously rotate. At the moment, in order for the outgoing light and the incoming light not to be blocked by the second mirror 52 and the first mirror 42, the first mirror 42 must be higher or lower than the second mirror 52 become same by forming the cam path 70 on the first barrel 41 or the second barrel 51.

Figure 8:
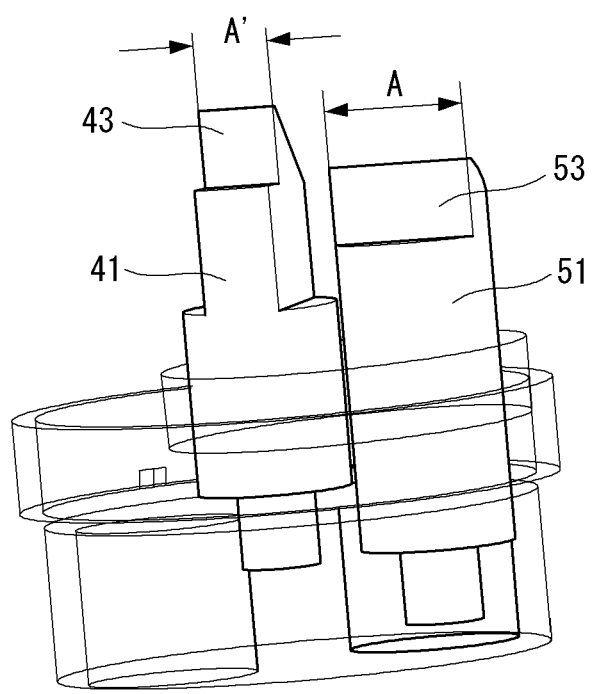
FIG. 8 shows a second embodiment in which the light outgoing surface is formed higher than the light incoming surface and the width of the light outgoing surface is narrower than the width of the light incoming surface.

FIG. 8 shows a second embodiment in which the light outgoing surface is formed higher than the light incoming surface and the width of the light outgoing surface is narrower than the width of the light incoming surface.

If it is not necessary to measure distances in the full 360 degree angular range, there is no need for forming a cam path in an outer circumference of one of the first and second rotary units 40 and 50 to move the one up and down while the first and second rotary units 40 and 50 rotate. Instead, forming the light outgoing surface 43 higher than the light incoming surface 53 or forming the light outgoing surface 43 lower than the light incoming surface 53, distances may be measured only in some angular ranges.

When forming the light outgoing surface 43 higher than the light incoming surface 53, distance measurement cannot be performed in predetermined angular range around an angle at which the outgoing light is directed in an opposite direction to the second rotary unit 50. When forming the light outgoing surface 43 lower than the light incoming surface 53, distance measurement cannot be performed in predetermined angular range around an angle at which the outgoing light is directed to the second rotary unit 50.

In order to reduce the angular range in which distance measurement is not performed when, for example, forming the light outgoing surface 43 higher than the light incoming surface 53 (or when positioning the first mirror 42 higher than the second mirror 52, the width A' of the light outgoing surface 43 may be made narrower than the width A of the light incoming surface 53 as shown in FIG. 8.

While dividing the direction in which the outgoing light changing its direction at the first mirror 42 horizontally advances into a first direction from the first rotary unit 40 to the second rotary unit 50 and a second direction perpendicular to the first direction, let's assume a condition that the outgoing light has a negative value as a component of the first direction and a non-zero value as a component of the second direction, that is the outgoing light does not advance in a totally reverse direction of the second rotary unit 50 but advances in the direction substantially opposite to the second rotary unit 50. In the above-assumed condition, the mirror shapes in FIG. 8 may reduce the angular range in which the first mirror 42 interferes with the incident light that is reflected from an object and travels toward the second mirror 52, FIGS. 9a to 9c show that reflected light is incident on the light incoming surface having the same direction as the light outgoing surface, when the first/second rotary units rotate synchronously in a condition that the first rotary unit, the motor, and the second rotary unit are arranged at an acute angle, in the second embodiment of FIG. 8.

Figure 9A:
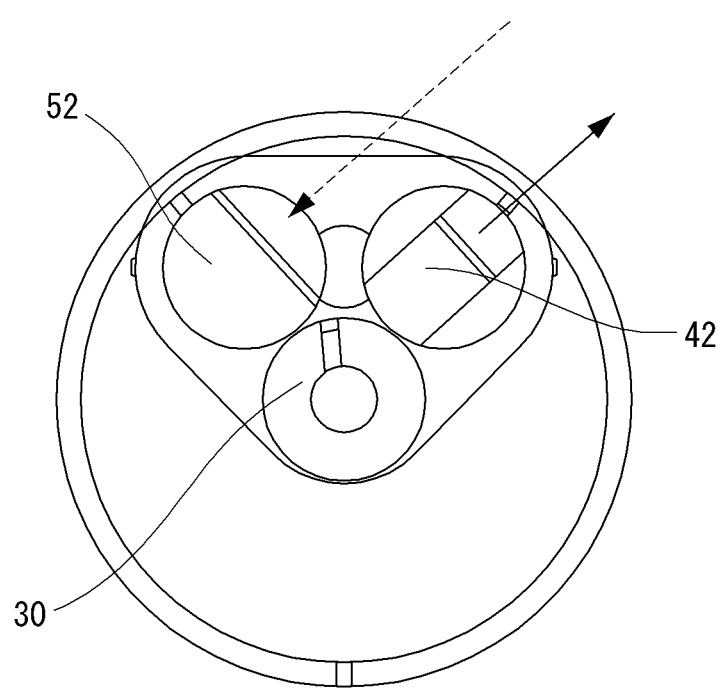
FIGS. 9a to 9c show that reflected light is incident on the light incoming surface having the same direction as the light outgoing surface, when the first/second rotary units rotate synchronously in a condition that the first rotary unit, the motor, and the second rotary unit are arranged at an acute angle, in the second embodiment of FIG. 8.
Figure 9B:
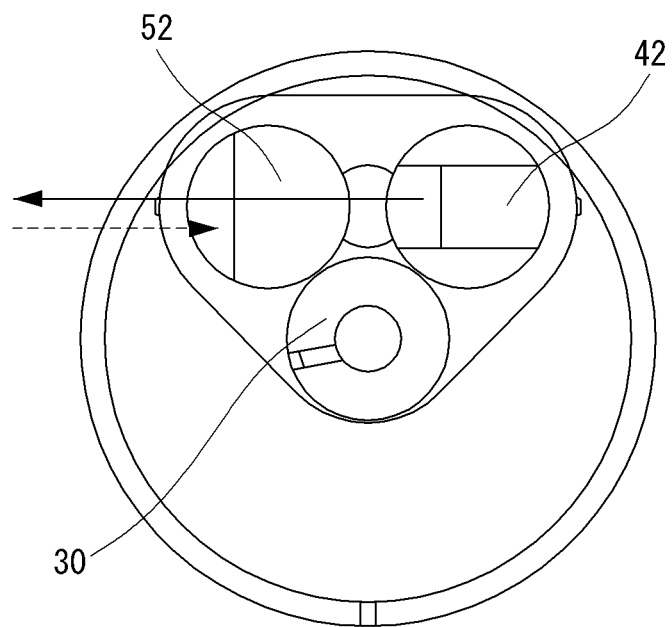
Figure 9C:
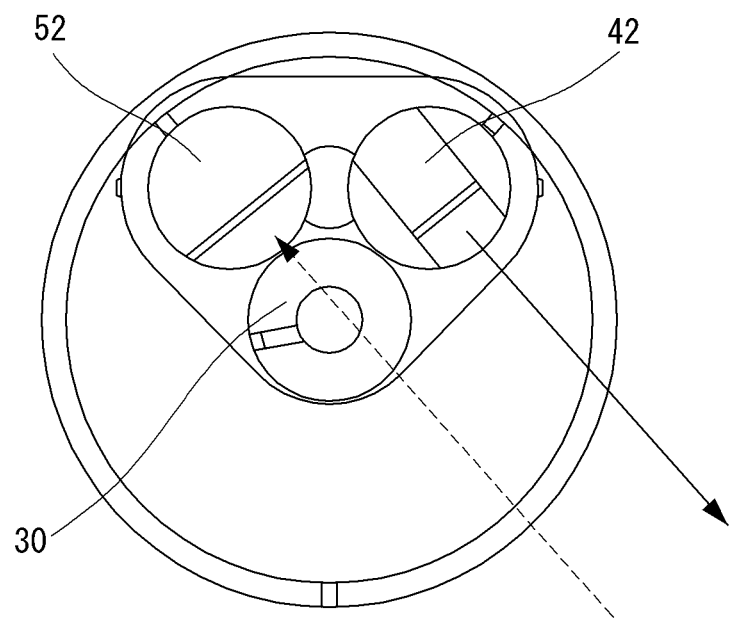

FIGS. 9a to 9c are different from FIG. 5 in which the first and second rotary unit 40 and 50 synchronously rotating while being connected to the motor 30 are arranged in a symmetrical manner about the motor 30. In FIG. 9, the first rotary unit 40, the motor 30 and the second rotary unit 50 are arranged at an acute angle.

In the arrangement of FIG. 5, the first and second rotary units 40 and 50 are disposed on a diameter passing through the rotation center of the motor 30, that is the center of the circular cap 60, a first straight line connecting the center of the first rotary unit 40 and a point on the circular cap 60 and a second straight line connecting the point on the circular cap 60 and the center of the second rotary unit 50 form an angle of about 90 degrees (actually less than 90 degrees).

Accordingly, even though both of the light outgoing surface 43 and the light incoming surface 53 are directed in any direction from 0 degree to 360 degrees, some portion of the outgoing light coming from the light outgoing surface 43 of the first mirror 42 may be reflected on the inside surface of the circular cap 60, advance to the light incoming surface 53 of the second mirror 52 and then converge on the light receiving unit 20 as unnecessary light, thereby causing an error in measuring distance.

However, if the first rotary unit 40, the motor 30 and the second rotary unit 50 are disposed at an acute angle as shown in FIGS. 9a to 9c, the angle of the first rotary unit 40, the point at which the outgoing light coming from the light outgoing surface 43 of the first mirror 42 and the second rotary unit 50 becomes an acute angle much less than 90 degrees. So, even though some of the outgoing light coming from the light outgoing surface 43 of the first mirror 42 is reflected by an inner surface of the cap 60, there is a high possibility that the reflected light does not advance to the incoming surface 53 of the second mirror 52. Thus, the problem may be solved that the light radiated from the light emitting unit 10 is reflected by the cap 60 to directly enter the light receiving unit 20.

Meanwhile, in FIG. 9a, the light outgoing surface 43 and the light incoming surface 53 are oriented at about 50 degrees with respect to a horizontal line. This angle corresponds to a minimum angle at which the reflected light, which comes from the light outgoing surface 43 of the first mirror 42 and is reflected from an object, enters the light incoming surface 53 of the second mirror 52 without being disturbed by the first mirror 42.

In FIG. 9b, the light outgoing surface 43 and the light incoming surface 53 are oriented at 180 degrees with respect to the horizontal line. Since the first mirror 42 are disposed higher than the second mirror 52, the reflected light which comes out from the light outgoing surface 43 of the first mirror 42 and is reflected from an object may enter the light incoming surface 53 of the second mirror 52 without being disturbed by the first mirror 42.

In FIG. 9c, the light outgoing surface 43 and the light incoming surface 53 are oriented at about −50 degrees with respect to the horizontal line. This angle corresponds to a maximum angle at which the reflected light, which comes from the light outgoing surface 43 of the first mirror 42 and is reflected from an object, enters the light incoming surface 53 of the second mirror 52 without being disturbed by the first mirror 42.

In order to decrease the minimum angle of FIG. 9a and increase the maximum angle at which distance measurement can be performed, the width A' of the light outgoing surface 43 of the first mirror 42 may be reduced as shown in FIG. 8.

Here, the width A' of the light outgoing surface 43 indicates a distance along a direction perpendicular to both a first direction in which the light radiated from the light emitting unit 10 rises vertically toward the first mirror 42 and a second direction in which the outgoing light which is reflected by the first mirror 42 advances horizontally.

Figure 9D:
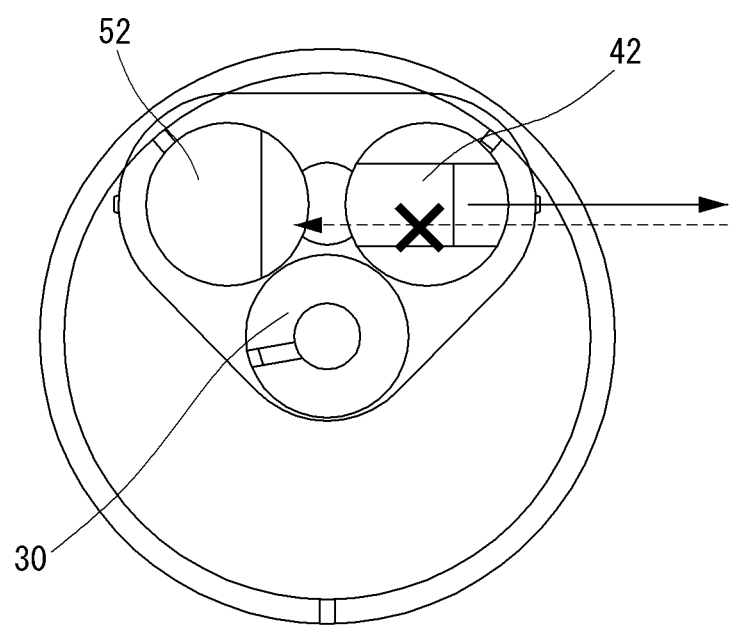
FIG. 9d shows that reflected light reflected by an object at a predetermined angle is blocked by the first rotary unit and is not incident on the second rotary unit, when the first/second rotary units rotate synchronously in a condition that the first rotary unit, the motor, and the second rotary unit are arranged at an acute angle, in the second embodiment of FIG. 8.

FIG. 9d shows that reflected light reflected by an object at a predetermined angle is blocked by the first rotary unit and is not incident on the second rotary unit, when the first/second rotary units rotate synchronously in a condition that the first rotary unit, the motor, and the second rotary unit are arranged at an acute angle, in the second embodiment of FIG. 8.

In FIG. 9d, the light outgoing surface 43 and the light incoming surface 53 are oriented at 0 degree with respect to the horizontal line. Since the first mirror 42 are disposed higher than the second mirror 52, the reflected light, which comes out from the light outgoing surface 43 of the first mirror 42 and is reflected from an object, is disturbed by the first mirror 42 so does not enter the light incoming surface 53 of the second mirror 52.

Figure 10:
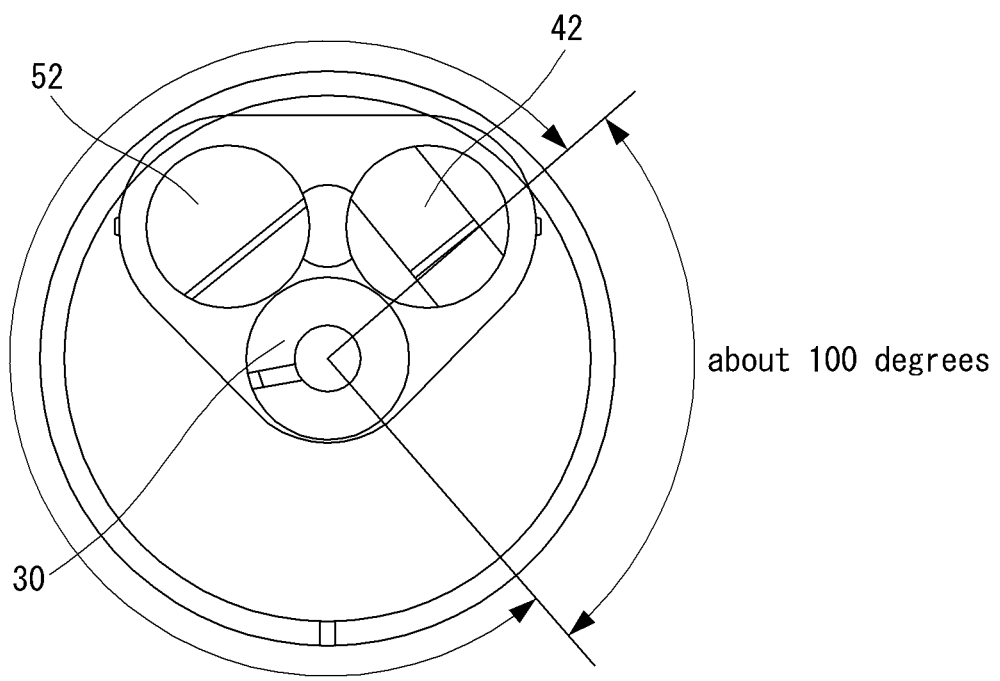
FIG. 10 shows an angular range in which distance measurement is possible and an angular range in which distance measurement is impossible, when the first/second rotary units rotate synchronously in a condition that the first rotary unit, the motor, and the second rotary unit are arranged at an acute angle, in the second embodiment of FIG. 8.

FIG. 10 shows an angular range in which distance measurement is possible and an angular range in which distance measurement is impossible, when the first/second rotary units rotate synchronously in a condition that the first rotary unit, the motor, and the second rotary unit are arranged at an acute angle, in the second embodiment of FIG. 8.

When the oriented angle of the light outgoing surface 43 and the light incoming surface 53 is 0 degree with respect to the horizontal line as shown in FIG. 9*d*, and when the oriented angle of the light outgoing surface 43 and the light incoming surface 53 is within +/−50 degrees (about 100 degrees), the reflected light is disturbed by the first mirror 42 and does not enter the light incoming surface 53 of the second mirror 52, so distance measurement cannot be performed. The distance may be measured in the remaining 260 degrees.

Meanwhile, in another embodiment of the present invention, the first rotary unit 40 and the second rotary unit 50 are not separated, only one rotary unit having a mirror is provided and rotated, and the light emitting unit 10 and the light receiving unit 20 are disposed below a barrel of the rotary unit at a distance narrower than the diameter of the barrel (that is the interval between the light emitting unit 10 and the light receiving unit 20 is less than the diameter of the barrel). One rotating mirror may change the path of the outgoing light radiated upward from the light emitting unit 10 to cause the outgoing light to horizontally advance in the range of 360 degrees, and change the path of the incoming light incident horizontally in the range of 360 degrees to cause the incoming light to advance downward to the light receiving unit 20.

Thus, by employing two rotary units which can rotate and move up and down so that optical paths do not overlap, it is possible to eliminate the structure for transmitting and receiving power and signals wirelessly and the structure can be simplified. Furthermore, by modifying the positions of the first and second rotary units, it is possible to reduce the error caused by the reflection of the outgoing light from the cover.

As described above, the embodiments of the present invention have been disclosed for illustrative purposes, and those skilled in the art may improve, change, replace, or add various other embodiments without departing from the technical spirit and scope of the present invention disclosed in the attached claims.

What is claimed is:

1. A distance measuring apparatus, comprising:
   a light emitting unit for emitting light;
   a light receiving unit comprising one or more cells configured to receive incoming light and output a signal corresponding to an amount of the received light;
   a motor;
   a first rotary unit for changing a path of outgoing light which is emitted from the light emitting unit while being rotated by the motor; and
   a second rotary unit for changing a path of the incoming light so that the incoming light enters the light receiving unit while being rotated by the motor synchronously with the first rotary unit,
   wherein the first rotary unit comprises a first mirror for changing the path of the outgoing light by 90 degrees and a first cylinder, the first cylinder having a first end which is open toward the light emitting unit and a second end which is equipped with the first mirror, and the second rotary unit comprises a second mirror for changing the path of the incoming light by 90 degrees and a second cylinder, the second cylinder having a first end which is open toward the light receiving unit and a second end which is equipped with the second mirror,
   wherein the first and second mirrors are oriented toward a same direction while the first and second rotary units synchronously rotate, and
   wherein gears which are respectively formed on outer circumferences of the first and second cylinders are respectively engaged with a gear formed on a rotation shaft of the motor.

2. The distance measuring apparatus of claim 1, wherein a cam path is formed on an outer circumference of at least one of the first and second cylinders such that the at least one moves up and down while the first and second rotary units rotate.

3. The distance measuring apparatus of claim 2, wherein, while the first and second rotary units synchronously rotate, the first mirror is placed at a highest position when the outgoing light reflected at the first mirror advances toward the second rotary unit and the first mirror is placed at a lowest position when the outgoing light reflected at the first mirror advances toward a direction opposite to the second rotary unit.

4. The distance measuring apparatus of claim 1, wherein the first mirror is disposed higher than the second mirror.

5. The distance measuring apparatus of claim 1, wherein the first mirror has a narrower width than the second mirror, the width of the first mirror indicating a distance along a direction perpendicular to both a first direction in which the outgoing light radiated from the light emitting unit advances toward the first mirror and a second direction in which the outgoing light which is reflected by the first mirror advances.

6. The distance measuring apparatus of claim 1, wherein the first and second rotary units are arranged in a symmetrical manner about a rotation axis of the motor.

7. The distance measuring apparatus of claim 1, wherein the first rotary unit and the second rotary unit are arranged such that a first line connecting a center of the first rotary unit and a rotation axis of the motor and a second line connecting a center of the second rotary unit and the rotation axis of the motor form an acute angle.

8. The distance measuring apparatus of claim 1, further comprising:
   a cap for covering the light emitting unit, the light receiving unit, the motor, the first rotary unit and the second rotary unit.

9. A distance measuring apparatus, comprising:
   a light emitting unit for emitting light;
   a light receiving unit comprising one or more cells configured to receive incoming light and output a signal corresponding to an amount of the received light;
   a motor;
   a rotary unit comprising a mirror for changing a path of the outgoing light by 90 degrees and changing a path of the incoming light by 90 degrees so that the incoming light enters the light receiving unit and a cylinder one end of which is open toward the light emitting unit and the light receiving unit and the other end of which is equipped with the mirror,
   wherein a distance between the light emitting unit and the light receiving unit is less than a diameter of the cylinder.

* * * * *